(12) United States Patent
Morishita et al.

(10) Patent No.: US 11,017,273 B2
(45) Date of Patent: May 25, 2021

(54) CURRENCY CLASSIFICATION DEVICE AND CURRENCY CLASSIFICATION METHOD

(71) Applicant: GLORY LTD., Hyogo (JP)

(72) Inventors: Ruka Morishita, Hyogo (JP); Toru Yonezawa, Hyogo (JP); Kazuya Tada, Hyogo (JP); Hideaki Manabe, Hyogo (JP)

(73) Assignee: GLORY LTD., Hyogo (JP)

( * ) Notice: Subject to any disclaimer, the term of this patent is extended or adjusted under 35 U.S.C. 154(b) by 18 days.

(21) Appl. No.: 16/338,815

(22) PCT Filed: Sep. 27, 2017

(86) PCT No.: PCT/JP2017/034963
§ 371 (c)(1),
(2) Date: Apr. 2, 2019

(87) PCT Pub. No.: WO2018/066431
PCT Pub. Date: Apr. 12, 2018

(65) Prior Publication Data
US 2020/0042835 A1 Feb. 6, 2020

(30) Foreign Application Priority Data
Oct. 7, 2016 (JP) .............................. JP2016-199113

(51) Int. Cl.
*G06K 9/62* (2006.01)
*G06K 9/46* (2006.01)

(52) U.S. Cl.
CPC ......... *G06K 9/6267* (2013.01); *G06K 9/4604* (2013.01); *G06K 9/6215* (2013.01)

(58) Field of Classification Search
CPC ................ G07D 5/005; G07D 7/2016; G07D 7/202–206
See application file for complete search history.

(56) References Cited

U.S. PATENT DOCUMENTS

2007/0165936 A1 7/2007 Yonezawa et al.
2008/0030798 A1* 2/2008 O'Neil .................. G07D 7/206
358/448
(Continued)

FOREIGN PATENT DOCUMENTS

JP 2000-163587 A 6/2000
JP 2003-233851 A 8/2003
(Continued)

OTHER PUBLICATIONS

Extended European Search Report dated Apr. 7, 2020 issued in European Application No. 17858269.8.
(Continued)

*Primary Examiner* — Vincent Rudolph
*Assistant Examiner* — Raphael Schwartz
(74) *Attorney, Agent, or Firm* — Greenblum & Bernstein, P.L.C.

(57) ABSTRACT

A currency classification device that classifies currency types using currency images includes a feature value calculator, a storage, and an output unit. The feature value calculator calculates feature values for every currency type that is a candidate for classification from an image area common in images of every currency type. The storage stores the feature values calculated by the feature value calculator from learning images, which are currency models, as templates for every currency type. The output unit outputs the currency type corresponding to the template having a highest value of similarity with the feature value calculated by the feature value calculator an input image, which is a currency image subject to classification, in the templates stored in the storage as a classification result.

13 Claims, 9 Drawing Sheets

(56) References Cited

U.S. PATENT DOCUMENTS

| | | | | |
|---|---|---|---|---|
| 2012/0301009 A1* | 11/2012 | Dabic | ............. | G07D 5/005 |
| | | | | 382/136 |
| 2014/0180981 A1* | 6/2014 | Dolev | ............. | G06K 9/00442 |
| | | | | 706/12 |
| 2017/0236355 A1* | 8/2017 | Chabanne | ............. | G07D 7/2016 |
| | | | | 382/159 |

FOREIGN PATENT DOCUMENTS

| | | |
|---|---|---|
| JP | 2006-164192 A | 8/2003 |
| JP | 2003-281593 A | 10/2003 |
| JP | 2005-31843 A | 2/2005 |
| JP | 2006-185364 | 7/2006 |
| JP | 4580324 B | 11/2010 |
| JP | 2015-18399 A | 1/2015 |
| JP | 2016-004333 | 1/2016 |
| KR | 10-2007-0031995 | 3/2007 |
| WO | 2012/099435 | 7/2012 |

OTHER PUBLICATIONS

International Search Report issued in International Patent Application No. PCT/JP2017/034963, dated Oct. 31, 2017.
International Preliminary Report on Patentability issued in International Patent Application No. PCT/JP2017/034963, dated Apr. 9, 2019.
Japanese Office Action dated Jul. 7, 2020 issued in Japanese Patent Application No. 2016-199113, along with corresponding English translation.

* cited by examiner

CURRENCY CLASSIFICATION DEVICE AND CURRENCY CLASSIFICATION METHOD

TECHNICAL FIELD

The present invention relates to a currency classification device and a currency classification method that classify currency types using images of currencies.

BACKGROUND ART

Patent document 1 describes a known currency classification device. The device stores, in advance, aggregated image data (feature value) of image areas that are characteristic to the design of currencies used in regions as templates for each region. Further, the device compares aggregated image data (feature value) of each image area of currency subject to classification with the aggregated image data of the templates. Then, the region corresponding to the template determined to have the highest correlation is classified as the region to which the subject currency belongs. Subsequently, the device further classifies in detail types of only the currency of which region has been classified to reduce the processing time required for classification of the currency type.

PRIOR ART LITERATURE

Patent Literature

Patent Document 1: Japanese Patent No. 4580324

SUMMARY

Problem to be Solved by the Invention

When a currency has classification candidates belonging to many regions, the above currency classification device needs to repeat calculation of the aggregated image data of the image area corresponding to each region for a number of times that is the same as the number of regions. In this respect, there is room for improvement in reducing the required processing time for classification of currency types.

It is an objective of the present disclosure to provide a currency classification device and a method for classifying currency that reduce required processing time for classification of currency types.

Means for Solving the Problem

In one general aspect, a currency classification device that classifies currency types using currency images includes a feature value calculator, a storage, and an output unit. The feature value calculator calculates feature values for every currency type that is a candidate for classification from an image area common in images of every currency type. The storage stores the feature values calculated by the feature value calculator from learning images, which are currency models, as templates for every currency type. The output unit outputs the currency type corresponding to the template having a highest value of similarity with the feature value calculated by the feature value calculator from an input image, which is a currency image subject to classification, in the templates stored in the storage as a classification result.

In another general aspect, a method for classifying types of currency using currency images includes steps of calculating feature values for every currency type that is a candidate for classification from an image area common in images of every currency type, reading the feature values calculated from learning images, which are currency models, as templates for every currency type, and outputting the currency type corresponding to the template having a highest value of similarity with the feature values calculated from an input image, which is a currency image subject to classification, in the read templates as a classification result.

With the above configuration, a common image area used for the calculation of feature values is set for all currency types so that even when there are many candidate currency types, there is no need to repeat the calculation of feature values using the input image, which is the image of the currency subject to classification, while changing the image area. Accordingly, the feature values are calculated less frequently compared to a configuration in which the feature values are calculated from the image areas that differ for each currency type or for each region to which the currency belongs. This reduces the required processing time for classification of currency types.

Preferably, the output unit outputs the currency type corresponding to the template having a similarity that is greater than or equal to a predetermined threshold value including the currency type corresponding to the template having the highest value of similarity as the classification result.

With the above configuration, the predetermined threshold value is set in a preferred manner so that two or more currency types can be output as the classification result. This classifies the currency types further flexibly.

Preferably, the output unit outputs classification results of the currency types corresponding to the templates in order of similarity from higher ones including the currency type corresponding to the template having the highest value of similarity.

With the above configuration, the candidate currency types can be output as a list in order from those having a higher similarity. This classifies the currency types further flexibly.

Preferably, the feature value calculator calculates the feature values based on different calculation conditions, and the similarity is calculated using all of the feature values calculated by the feature value calculator from the input image that is the currency image subject to classification.

With the above configuration, even when a common image area used for the calculation of feature values is set to the images of all currency types, the currency type is classified using the feature values having different calculation conditions. This improves the accuracy for classification of the currency types.

Preferably, the feature value calculator calculates the feature values based on different calculation conditions, and the template is calculated as an average value or a median value of the feature values calculated from learning images corresponding to the same currency type. Further it is preferred that the similarity is calculated by comparing dispersion degrees of the feature values used to calculate the template of each currency type for each of the calculation conditions and giving priority to the feature values calculated based on the calculation conditions having relatively small dispersion degrees.

With the above configuration, the similarities are calculated giving priority to feature values that are unlikely to be affected by changes in the designs of currencies resulting from circulation and usage conditions such as scratches, wear, stains, and the like (hereafter, referred to as "currency circulation change(s)") among the feature values calculated based on the calculation conditions. This improves the accuracy of classification of the currency types.

Preferably, the feature value calculator calculates the feature values based on an edge gradient component extracted from a currency image.

Preferably, the feature value calculator extracts edge gradient components having different edge directions and calculates the feature values based on ratios of the extracted edge gradient components.

With the above configuration, even when the currency circulation changes or the like changes a brightness value of the entire input image of the subject currency, the effect of such a change in the brightness value is reduced. This further improves the accuracy of classification of the currency types.

Preferably, the feature value calculator calculates the feature values based on an edge strength component extracted from the currency image.

With the above configuration, the feature values are calculated from the edge strength component extracted from the image of currency in addition to the edge gradient components. In contrast to a configuration in which the feature values are calculated using only the edge gradient components, information about edges in different directions is included in the edge strength image for each currency image so that the design of currency can be recognized continuously. This further improves the accuracy for classification of the currencies.

Preferably, the feature value calculator calculates an autocorrelation function curve that has a coordinate axis extending in an angular direction about a reference point of the currency image as the feature value for each position in a radial direction from the reference point of the currency image, and the similarity is calculated based on synchronization features of the autocorrelation function curve calculated by the feature value calculator from the input image and the autocorrelation function curve calculated by the feature value calculator from the learning image for each currency type.

With the above configuration, the image of the subject currency is compared to the templates using the autocorrelation function curve as the feature value. The autocorrelation function is independent of a rotation position about the reference point of the currency image so that there is no need to adjust angles of the images during comparison. This further reduces the required processing time for currency classification.

Preferably, the feature value calculator adds image data of multiple positions in the radial direction from the reference point of the currency image for each position in the angular direction about the reference point of the image of currency and calculates the autocorrelation function curve for each positon in the radial direction from the preference point of the currency image based on the image data obtained through the addition.

With the above configuration, currency designs are recognized from many aspects. This further improves the accuracy for currency type classification.

DETAILED DESCRIPTION

One embodiment of a currency classification device applied to a coin classification device used for classifying coins, which is a type of currency, will now be described with reference to the drawings.

The coin classification device of the present embodiment is a device configured to classify coin types even when there are many coin types, such as Euro coins, and making it difficult to classify coin types based on the diameters or the materials of the coins. Specifically, the device is configured to classify the coin types from images of the coins. The device first calculates feature values for images of all coin types from a common image area. Then, the device calculates the similarity of the feature values calculated from an image of a coin subject to classification (input image) with the feature values (templates) calculated from the images of classification candidate coins (learning images). Consequently, the device outputs the coin type corresponding to the template having a highest value of similarity as a classification result.

Figure 1:
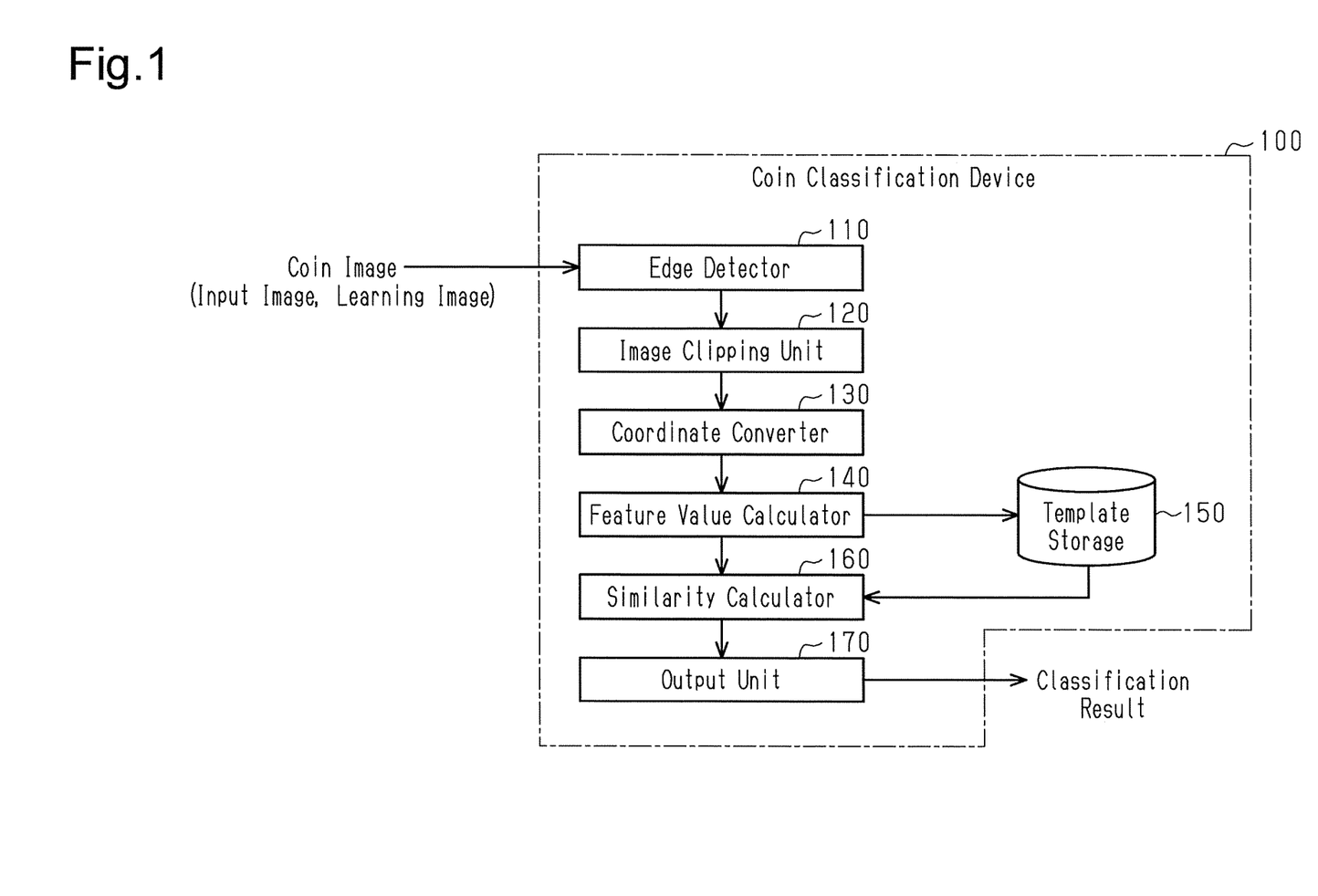
FIG. 1 is a block diagram showing the configuration of a currency classification device in accordance with one embodiment.

Specifically, as shown in FIG. 1, a coin classification device 100 is an electronic control device including, for example, a central processing unit (CPU), a read only memory (ROM), a random access memory (RAM), a backup RAM, an external input circuit, an external output circuit, and the like. The CPU executes programs for currency classification stored in the ROM so that the coin classification device 100 operates as an edge detector 110, an image clipping unit 120, a coordinate converter 130, a feature value calculator 140, a similarity calculator 160, and an output unit 170.

An image of a coin is input to the edge detector 110 as an input image or a learning image, and the edge detector 110 inputs the image to an edge gradient filter. Then, the edge detector 110 detects a variation degree of pixel values of the image of a coin, such as the design of the coin, as an edge gradient component and generates an edge gradient image.

Figure 2:
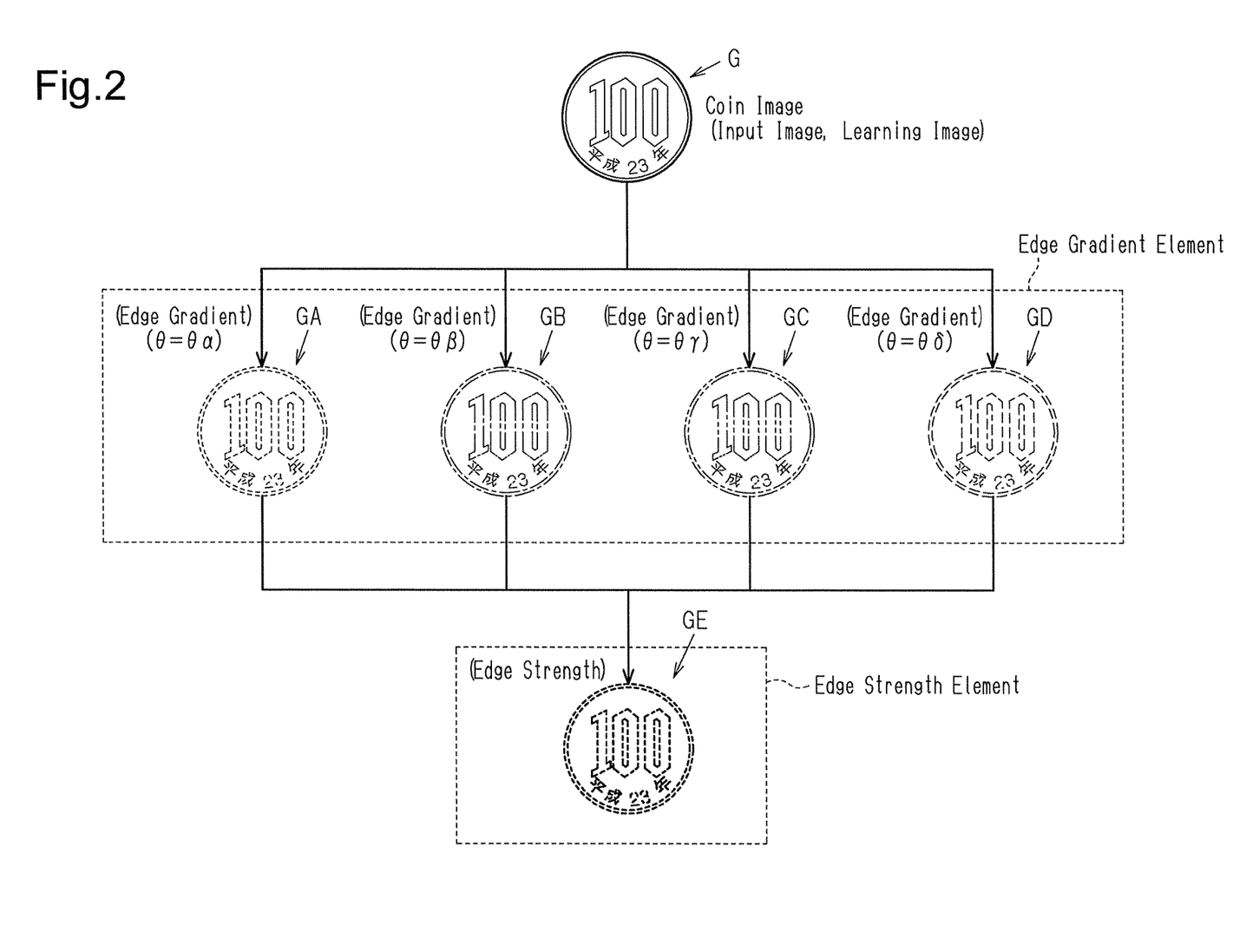
FIG. 2 is a schematic diagram showing examples of edge gradient images and an edge strength image.

More specifically, as shown in FIG. 2, the edge detector 110 extracts edge gradient components ("θα," "θβ," "θγ," and "θδ" in the example shown in FIG. 2) that have different edge directions from a coin image G, and generates corresponding edge gradient images GA, GB, GC, and GD. Further, the edge detector 110 uses the generated edge gradient images GA to GD to detect an edge strength component from the coin image G and generates an edge strength image GE. The edge detector 110 may input the coin image G to an edge strength filter to generate the edge strength image GE without generating the edge gradient images GA, GB, GC, and GD. Subsequently, the edge detector 110 outputs the edge gradient images GA to GD and the edge strength image GE generated from the coin image G to the image clipping unit 120.

The image clipping unit 120 clips a preset image area from the edge gradient images GA to GD and the edge strength image GE received from the edge detector 110.

Figure 3:
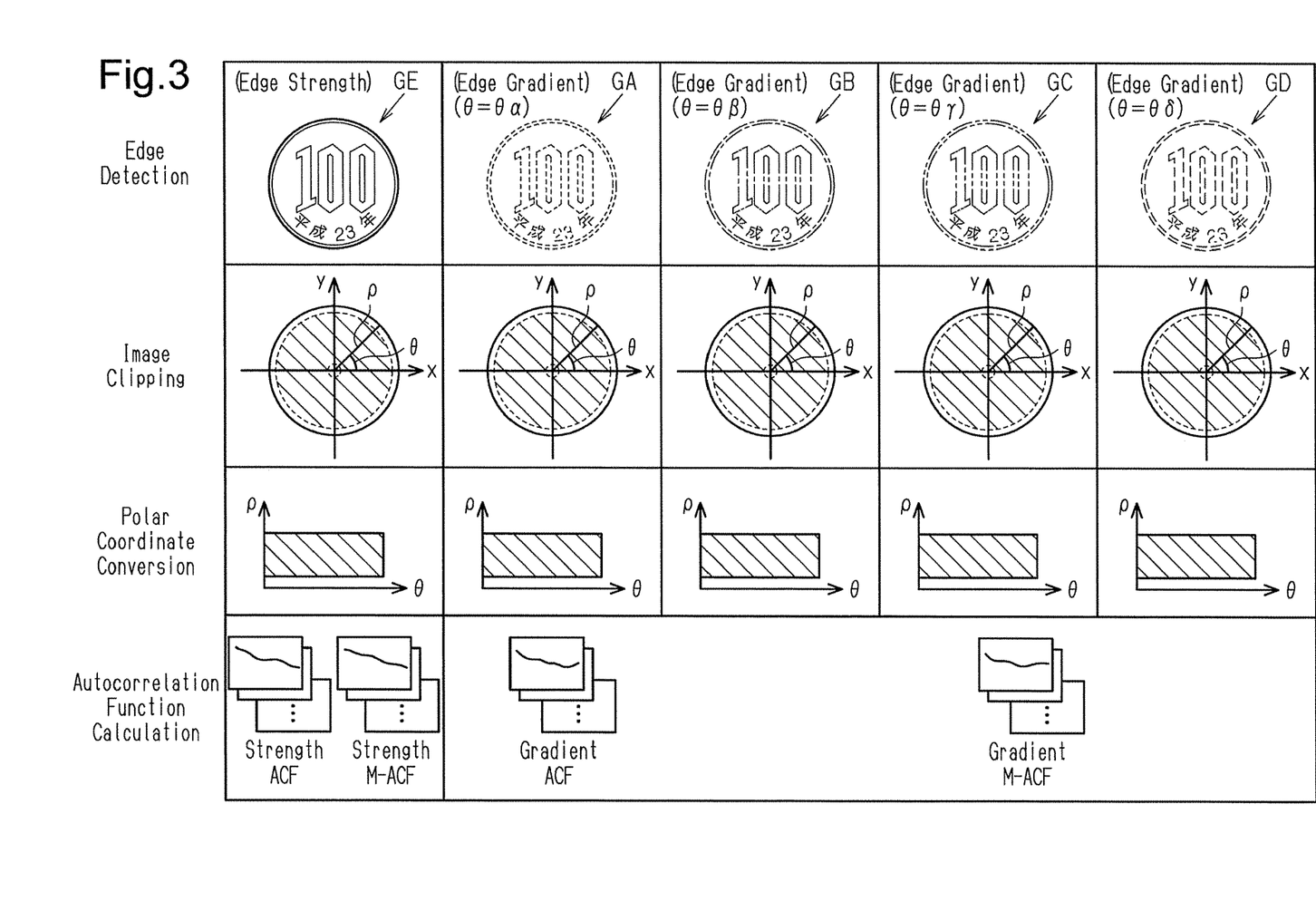
FIG. 3 is a schematic diagram illustrating a process for calculating autocorrelation functions from the edge gradient images and the edge strength image.

More specifically, as shown in FIG. 3, the image clipping unit 120 clips a common image area including a characteristic design from all classification candidate coins. Subsequently, the image clipping unit 120 outputs image data of the image areas clipped from the images GA to GE to the coordinate converter 130.

The coordinate converter 130 performs a polar coordinate conversion on the image data of the image area input from the image clipping unit 120 and then maps the image data on a xy-coordinate plane in an orthogonal coordinate system onto a $\rho\theta$-coordinate plane of a polar coordinate system. In the $\rho\theta$-coordinate plane of the polar coordinate system in the present embodiment, a radial direction $\rho$ corresponds to a radial direction from a reference point of the image of the coin, and an angular direction $\theta$ corresponds to an angular direction of the image of the coin about the reference point. When performing the polar coordinate conversion, the coordinate converter 130 also changes the image size of a coin so that the number of pixels in the radial direction $\rho$ and the number of pixels in the angular direction $\theta$ are constant regardless of the image size of the coin. Further, the coordinate converter 130 performs a normalization process on the pixel data of a predetermined image area in the image data that has undergone the polar coordinate conversion. Then, when necessary, the coordinate converter 130 performs block processing on the image data that has undergone the normalization process to reduce noise or the number of dimensions. Consequently, the coordinate converter 130 outputs the obtained image data to the feature value calculator 140.

The feature value calculator 140 calculates an autocorrelation function (ACF) that has a coordinate axis in the angular direction $\theta$ as "strength ACF" for each pixel located at each position in the radial direction $\rho$ in the polar coordinate system from the image data, which is obtained through the polar coordinate conversion of the edge strength image GE of the coin.

Figure 4A:
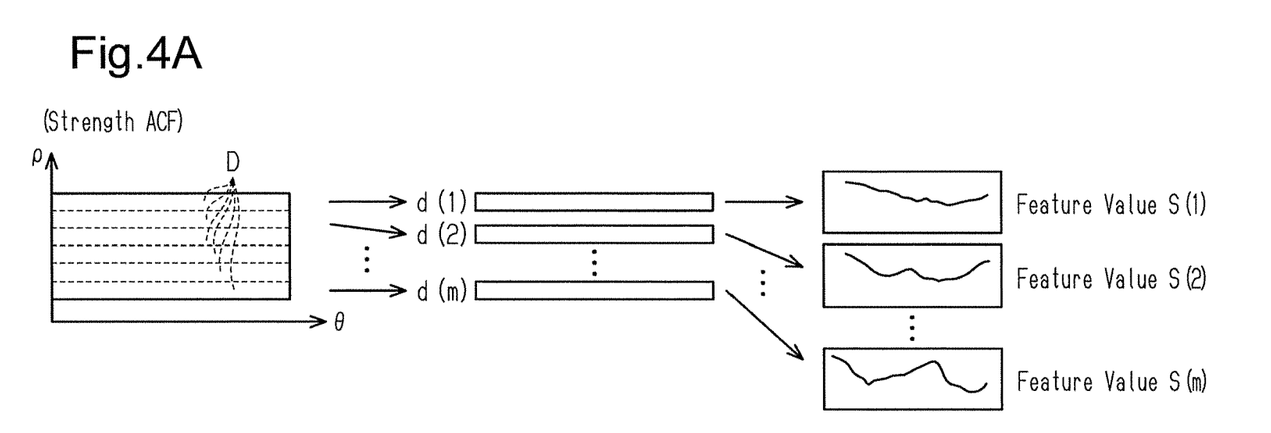
FIG. 4A is a schematic diagram illustrating a process for calculating strength ACF as an example of the autocorrelation function.

Specifically, as shown in FIG. 4A, the feature value calculator 140 divides the image data, which is obtained through the polar coordinate conversion of the edge strength image GE of the coin, into divided areas D of the pixel located at each position in the radial direction $\rho$ of the polar coordinate system. In the example of FIG. 4A, the divided area D in row "m" is arranged in the radial direction $\rho$ of the polar coordinate system as image data. In correspondence with each divided area D, the pixel groups, each of which extends in a single line in the angular direction $\theta$ of the polar coordinate system, are referred to as "d(1)" to "d(m)" in order from the upper side. The feature value calculator 140 uses each of the pixel groups to calculate the autocorrelation function (strength ACF). Further, the feature value calculator 140 standardizes the calculated autocorrelation function (strength ACF) using an average value and a standard deviation of the entire area in the angular direction $\theta$ of the polar coordinate system, which serves as the coordinate axis, and obtains "feature value S(1)" to "feature value S(m)" as exemplified in FIG. 4A.

Further, as shown in FIG. 3, the feature value calculator 140 calculates the autocorrelation function (ACF), of which the coordinate axis extends in the angular direction $\theta$, as "strength M (multiple)-ACF" for each integrated area including pixels located next to each other in the radial direction $\rho$ of the polar coordinate system in the image data, which is obtained through the polar coordinate conversion of the edge strength image GE of the coin. The usage of various features increases the amount of information.

Figure 4B:
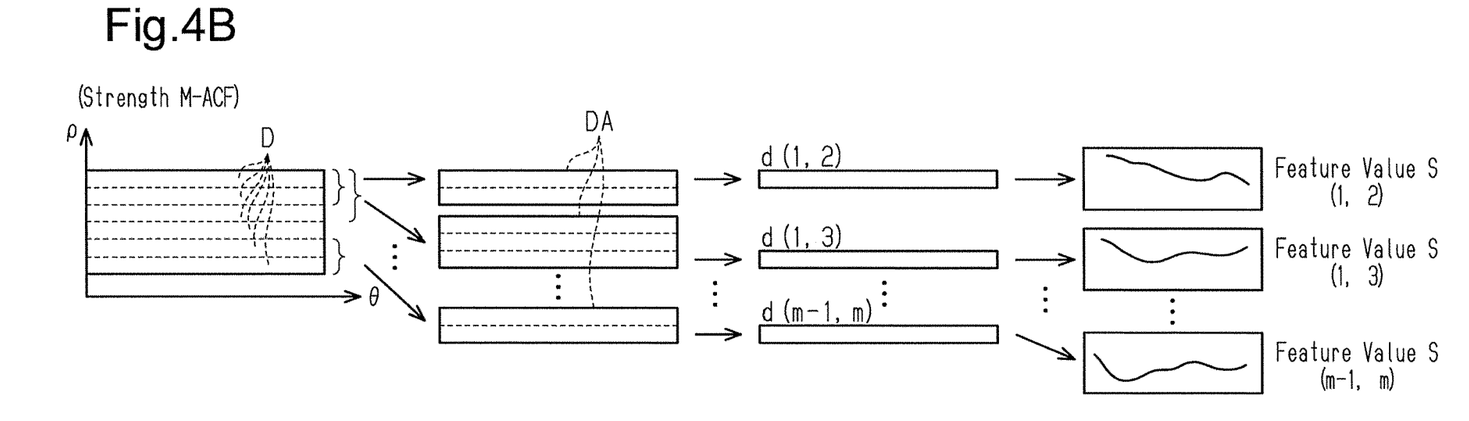
FIG. 4B is a schematic diagram illustrating a process for calculating strength M-ACF as an example of the autocorrelation function.

Specifically, as shown in FIG. 4B, the feature value calculator 140 divides the image data, which is obtained through the polar coordinate conversion of the edge strength image GE of the coin, into the divided areas D of the pixel located at each position in the radial direction $\rho$ of the polar coordinate system. In the example shown in FIG. 4B, in the same manner as the example of FIG. 4A, the divided areas D in row "m" are arranged in the radial direction $\rho$ of the polar coordinate system as image data. The divided areas D located next to each other in the radial direction $\rho$ in the polar coordinate system are combined thoroughly to form the above mentioned integrated areas DA. The integrated areas DA are added for each pixel located at the same position in the angular direction $\theta$ in the polar coordinate system to extract the pixel groups each arranged in a single line in the angular direction $\theta$ in the polar coordinate system. In this case, the pixel groups are each defined by a combination of the divided area D at the initiating row of the combined integrated areas DA and the divided area D at the terminating row of the combined integrated areas DA. For example, the pixel group obtained by combining the integrated areas DA including the divided area D of the first row and the divided area D of the second row in the radial direction $\rho$ in the polar coordinate system is referred to as "d(1,2)". The feature value calculator 140 uses each pixel group to calculate the autocorrelation function (strength M-ACF). Further, the feature value calculator 140 standardizes the autocorrelation function (strength M-ACF) using the average value and the standard deviation of the entire area in the angular direction $\theta$ in the polar coordinate system, which serves as the coordinate axis, and obtains "feature value S(1,2)" to "feature value S(m−1, m)" as exemplified in FIG. 4B.

As shown in FIG. 3, the feature value calculator 140 calculates the autocorrelation function (ACF) of which the coordinate axis extends in the angular direction $\theta$ as "gradient ACF" for the pixel located at each position in the radial direction $\rho$ in the polar coordinate system from the image data, which is obtained through the polar coordinate conversion of the edge gradient images GA to GD of the coin.

Figure 5:
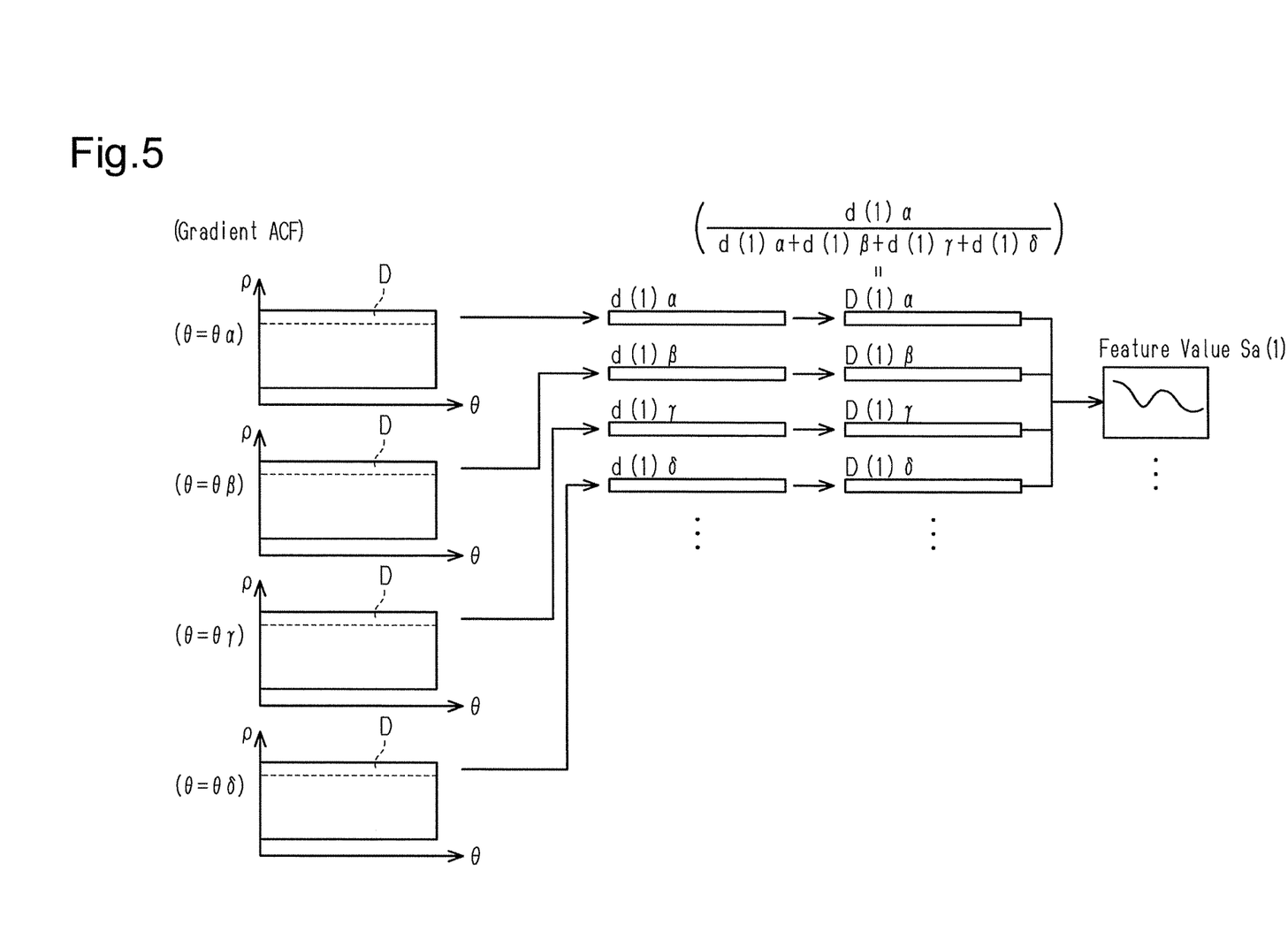
FIG. 5 is a schematic diagram illustrating a process for calculating gradient ACF as an example of the autocorrelation function.

Specifically, as shown in FIG. 5, the feature value calculator 140 divides the image data, which is obtained through the polar coordinate conversion of the edge gradient images GA to GD having different edge gradient directions into the divided areas D for the pixel located at each position in the radial direction $\rho$ of the polar coordinate system. In the example shown in FIG. 5, the pixel groups corresponding to the divided areas D of the uppermost row are respectively referred to as "d(1)$\alpha$," "d(1)$\beta$," "d(1)$\gamma$," and "d(1)$\delta$". Further, the feature value calculator 140 calculates ratios of the pixel values in the pixel groups to a total value of the pixel values in the pixel groups of the corresponding row as "D(1)$\alpha$," "D(1)$\beta$," "D(1)$\gamma$," and "D(1)$\delta$" from equation (1) shown below.

[Equation 1]

$$D(n)i = d(n)i/(d(n)\alpha + d(n)\beta + d(n)\gamma + d(n)\delta) \quad (1)$$

(where n=1, 2, ... m, i=$\alpha$, $\beta$, $\gamma$, $\delta$)

The feature value calculator 140 combines the ratios of the pixel values of the pixel groups to calculate the autocorrelation function (gradient ACF). Further, the feature value calculator 140 standardizes the calculated autocorrelation function (gradient ACF) using the average value and the standard deviation of the entire area in the angular direction θ of the polar coordinate system, which serves as the coordinate axis, and obtains "feature value Sa(1)" as exemplified in FIG. 5. In the same manner, the feature value calculator 140 calculates the ratios of the pixel values of the pixel groups of the second row and onward to the total value of the pixel values of the pixel groups in the corresponding rows. Then, the feature value calculator 140 uses the calculation results to calculate the autocorrelation functions (gradient ACF) that correspond to the pixel groups of the second row and onward.

As shown in FIG. 3, the feature value calculator 140 calculates the autocorrelation function (ACF) of which the coordinate axis extends in the angular direction θ as "gradient M-ACF" for each integrated area including multiple pixels located next to each other in the radial direction ρ of the polar coordinate system from the image data, which is obtained through the polar coordinate conversion of the edge gradient images GA to GD of the coin. The usage of various features increases the amount of information.

Figure 6:
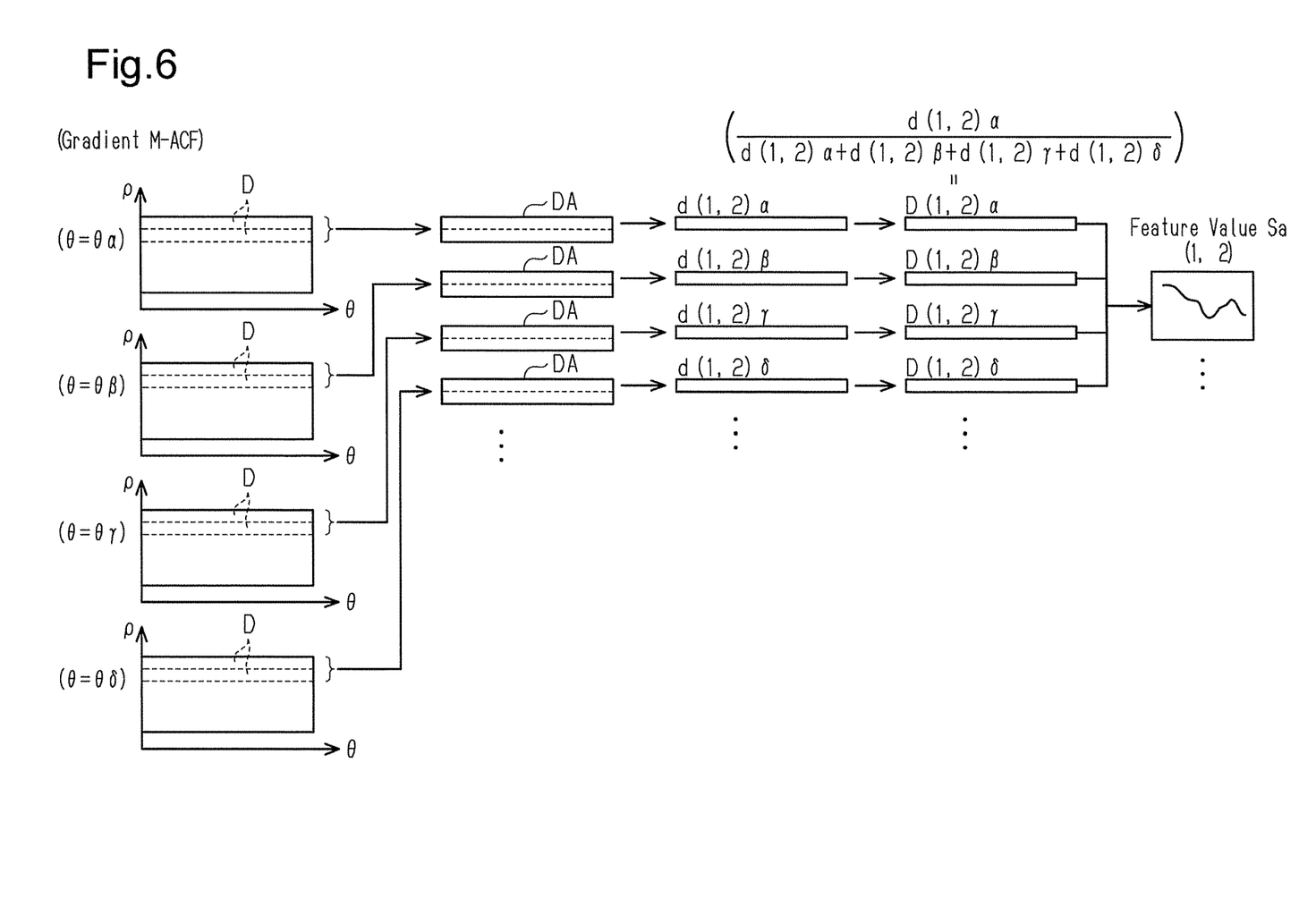
FIG. 6 is a schematic diagram illustrating a process for calculating gradient M-ACF as an example of the autocorrelation function.

Specifically, as shown in FIG. 6, the feature value calculator 140 divides the image data, which is obtained through the polar coordinate conversion of the edge gradient images GA to GD having different edge gradient directions, into the divided areas D for the pixel located at each position in the radial direction ρ in the polar coordinate system. In the example of FIG. 6, in the same manner as the example in FIG. 4B, the divided area D in row "m" is arranged in the radial direction ρ of the polar coordinate system as image data. The divided areas D located next to each other in the radial direction ρ of the polar coordinate system are combined thoroughly to form the above described integrated areas DA. The integrated areas DA are added for the pixels located at the same position in the angular direction θ of the polar coordinate system to extract the pixel groups each extending in a single line in the angular direction θ in the polar coordinate system. The pixel groups are each defined by a combination of the divided area D in the uppermost row of the combination of the integrated areas DA and the divided area D in the lowermost row of the combination of the integrated areas DA. For example, the pixel groups based on the integrated areas DA including the divided area D in the first row and the divided area D in the second row in the radial direction ρ in the polar coordinate system are each referred to as "d(1, 2)α," "d(1, 2)β," "d(1, 2)γ," and "d(1, 2)δ" for the edge gradient images GA to GD, which are source images. Then, the feature value calculator 140 calculates ratios of the pixel values of the pixel groups to a total value of the pixel values in the pixel groups of the corresponding integrated area as "D(1,2)α," "D(1,2)β," and "D(1, 2)γ," and "D(1,2)δ" from equation (2) shown below.

[Equation 2]

$$D(n1,n2)i = d(n1,n2)i/(d(n1,n2)\alpha + d(n1,n2)\beta + d(n1,n2)\gamma + d(n1,n2)\delta) \quad (2)$$

(where n1=1, 2, ... m−1, n2=2, 3, ... m, i=$\alpha$, $\beta$, $\gamma$, $\delta$)

The feature value calculator 140 combines the ratios of the pixel values of the pixel groups to calculate the autocorrelation function (gradient M-ACF). Further, the feature value calculator 140 standardizes the calculated the autocorrelation function (gradient M-ACF) using the average value and the standard deviation of the entire area in the angular direction θ in the polar coordinate system, which serves as the coordinate axis, and obtains "feature value Sa(1, 2)" as exemplified in FIG. 6. In the same manner, the feature value calculator 140 calculates the ratios of the pixel values of the pixel groups in the other integrated areas to the total value of the pixel values of the corresponding pixel groups. Then, the feature value calculator 140 uses the calculation results to calculate the autocorrelation functions (gradient M-ACF) corresponding to the pixel groups of the other integrated areas.

As shown in FIG. 3, when the edge strength image GE or the edge gradient images GA to GD of the coin are obtained from the learning images, the feature value calculator 140 stores "strength ACF," "strength M-ACF," "gradient ACF," and "gradient M-ACF" calculated as feature values of the images in a template storage 150. In this case, the feature values are associated with the coin types that are held in advance as learning data of the learning images. When the edge strength image GE or the edge gradient images GA to GD of the coin are obtained from the input image, the feature value calculator 140 outputs the "strength ACF," "strength M-ACF," "gradient ACF," and "gradient M-ACF" calculated as feature values of the image to the similarity calculator 160.

When the similarity calculator 160 receives various feature values obtained from the edge strength image GE and the edge gradient images GA to GD of the subject coin from the feature value calculator 140, the similarity calculator 160 computes synchronization features of the input feature values and the templates associated with coin types and stored in the template storage 150.

The synchronization feature is an index indicating the extent of similarity of the feature values and the templates. In the present embodiment, the Euclidean distance that compares values at each position on the coordinate axis of an autocorrelation function curve is used as an example. In this case, the Euclidean distance, which serves as the synchronization feature, decreases as the similarity of the feature values and the template increases, and the Euclidean distance increases as the similarity of the feature values and the template decreases.

Figure 7:
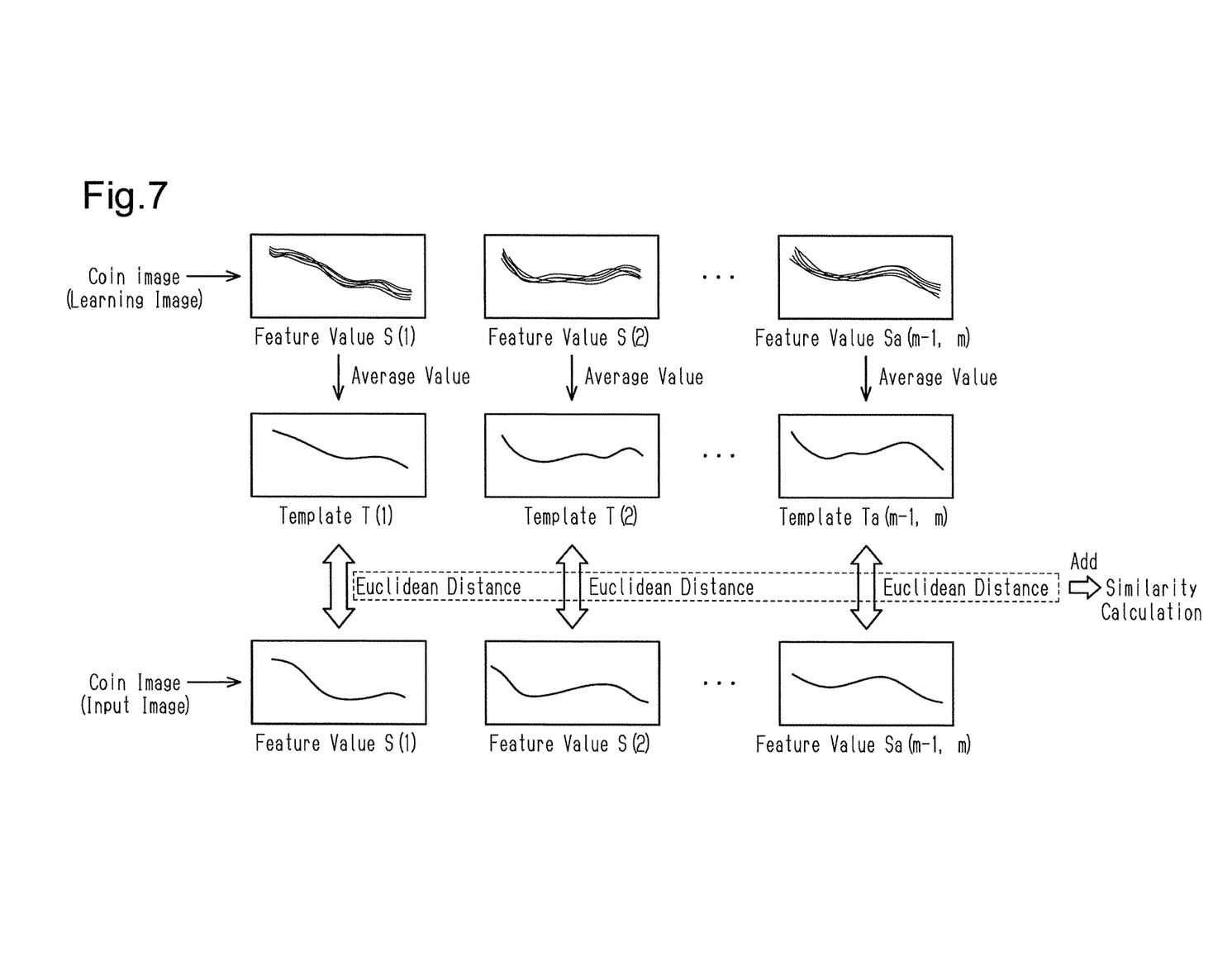
FIG. 7 is a schematic diagram illustrating a process for calculating similarities between a currency subject to classification and templates.

As shown in FIG. 7, when computing the synchronization features, the similarity calculator 160 first calculates, in advance, average values of the feature values stored in the template storage 150 based on the learning image as templates. Then, the similarity calculator 160 calculates the Euclidean distance for each feature value as the synchronization feature of the feature values obtained from the input image and the templates read from the template storage 150. Further, the similarity calculator 160 calculates the sum of the Euclidean distance of the feature value for each coin type.

Figure 8:
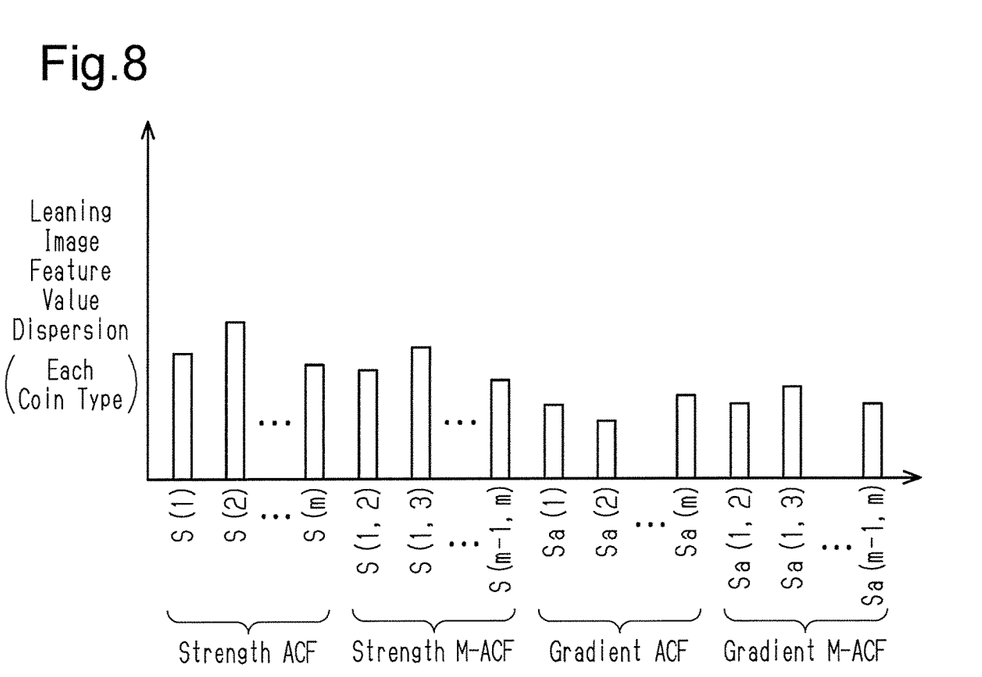
FIG. 8 is a graph showing an example of dispersion degrees of feature values of a learning image used for computation of templates.

As illustrated in the example shown in FIG. 8, in the present embodiment, when calculating the sum of the Euclidean distance, the similarity calculator 160 takes into consideration a dispersion degree of the feature values obtained from the learning image. That is, as shown in FIG. 8, the similarity calculator 160 computes the dispersion degree of the feature values obtained from the learning image for each feature value type such as "strength ACF," "strength M-ACF," "gradient ACF," and "gradient M-ACF".

The computation of the feature value dispersion degree is performed in advance for each coin type associated with the learning images. The similarity calculator 160 calculates the sum of the Euclidean distance giving priority to feature values with a relatively small dispersion degree, for example, by heavily weighing the feature values with relatively small dispersion degrees. In this case, the similarity calculator 160 may calculate the sum of the Euclidean distance by using the feature values with relatively large dispersion degrees together with the weighed feature values with relatively small dispersion degrees or by using only the feature values with relatively small dispersion degrees.

Then, the similarity calculator 160 outputs the sum of the Euclidean distance calculated as described above to the output unit 170 for each type of coin subject to comparison.

Subsequently, the output unit 170 compares the sum of the Euclidean distance input from the similarity calculator 160 for each candidate coin type and outputs the coin type corresponding to the template having a smallest sum as the classification result.

The coin classification process of the coin classification device 100 will now be described in detail.

Figure 9:
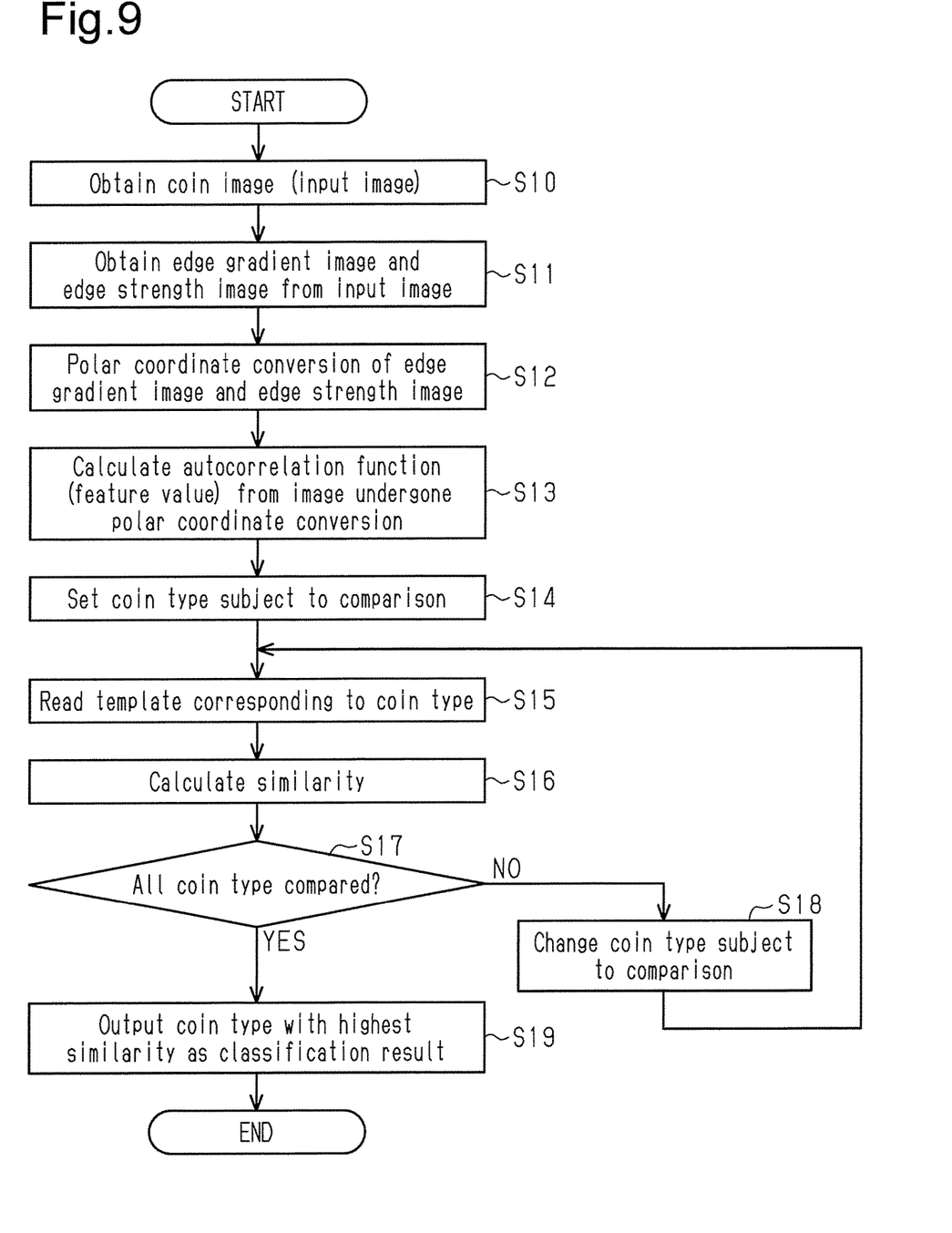
FIG. 9 is a flowchart illustrating a process of currency classification performed by the currency classification device in accordance with the embodiment.

As shown in FIG. 9, in the coin classification process, the coin classification device 100 first obtains an image of a coin subject to classification as the input image (step S10).

Then, the coin classification device 100 detects edges from the input image to obtain the edge gradient images GA to GD and the edge strength image GE (step S11).

Subsequently, the coin classification device 100 performs polar coordinate conversion on the edge gradient images GA to GD and the edge strength image GE (step S12) and calculates the autocorrelation functions from the images that have undergone the polar coordinate conversion as feature values (step S13, feature value calculation step).

The coin classification device 100 sets the coin types subject to comparison (step S14) and reads templates corresponding to the set coin types from the template storage 150 (step S15, reading step).

The coin classification device 100 calculates the similarity of the image of the subject coin and the images of the coins subject to classification based on the synchronization features of the autocorrelation functions, which are calculated as the feature values in step S13, and the autocorrelation functions, which are read as templates in step S15 (step S16).

Subsequently, when there are still coin types subject to comparison (step S17=NO), the coin classification device 100 changes the type of coin subject to classification (step S18) and returns to step S15.

The coin classification device 100 thereafter repeats steps S15 to S18 until all coin types are compared. When all coin types are compared (step S17=YES), the coin classification device 100 outputs the coin type having the highest similarity among the compared coin types as the classification result (step S19, output step) and ends the coin classification process shown in FIG. 9.

The operation of the currency classification device in accordance with the present embodiment will now be described.

When classifying coin types with a conventional configuration that calculates the feature values from the image areas that differ for each coin type subject to comparison or for each region to where the coin subject to comparison belongs, there is a need to repeat the calculation of feature values for a number of times that is the same as the number of times comparisons are performed with the image of a coin subject to classification. Thus, when classifying many types of coins including coins of foreign countries such as Euro coins, the processing time for coin classification will outstandingly increase as the number of types of coins subject to comparison increases.

In this respect, in the present embodiment, regardless of the type of coin subject to comparison, the feature values are calculated from a common image area of images of coins subject to classification. Accordingly, even when there are many types of coins subject to comparison, there is no need to repeat the calculation of feature values while changing the image area of the subject coin image. This reduces the processing time for classification of coins, even when the number of candidate coin types is increased.

Further, in the present embodiment, the edge gradient images based on the edge gradient components are obtained in addition to the edge strength image based on the edge strength component to calculate the feature value from each of the edge strength image and the edge gradient image. Thus, the edges extracted from the coin image are recognized from many aspects thereby improving the accuracy for classification of the coins.

Particularly, the present embodiment obtains the edge gradient images, which have different edge gradient directions, to calculate the total value of the pixel values for the area corresponding to each of the edge gradient images. Then, the feature values are calculated based on the ratios of the pixel values to the corresponding total value. That is, the feature values are calculated from the edge gradient images based on the ratios of the edge gradient components. The ratios of the edge gradient components calculated from the edge gradient images are unlikely to be affected by circulation changes of the coins. This allows for further accurate classification of the coins including those affected by circulation changes based on the feature values calculated from the ratios of the edge gradient components.

Further, in the present embodiment, during the feature value calculation, the feature values are not only calculated from each divided area extending in a single line in the angular direction θ of the polar coordinate system but also calculated from each integrated area including divided areas located next to each other in the radial direction in the angular direction θ of the polar coordinate system. This recognizes a wider variety of information related to the coin design and further improves the coin classification accuracy.

The above embodiment has the advantages described below.

(1) The feature values are calculated from a common image area in images of all types of coins that are classification candidates. This reduces the required processing time for the classification of the coins even when there are many coin type candidates.

(2) The dispersion degrees of the feature values, which are used for computation of the template for each currency type, are compared. Then, the similarities are calculated giving priority to the feature values with relatively small dispersion degrees. Thus, the similarity is calculated for each coin type giving priority to the feature values that are unlikely to be affected by circulation changes and the like. This improves the accuracy for classification of the currencies.

(3) The feature values are calculated using the edge gradient components that are more resistant to coin circulation changes than the edge strength component. This improves the coin classification accuracy.

(4) The edge gradient components having different edge gradient directions are extracted, and the feature values are calculated based on the ratios of the extracted edge gradient components. This reduces effects on the feature values caused by changes in a brightness value and further improves the coin classification accuracy.

(5) The feature values are calculated based on the edge strength component in addition to the edge gradient components extracted from the images of the coins. Thus, information about edges in different directions is included in the edge strength image and allows the currency design to be recognized continuously. This improves the accuracy for classifying currencies.

(6) The image of the subject coin is compared with the templates using the autocorrelation function curve as the feature value. The autocorrelation function curve is not dependent on the rotation position of the coin image. Thus, there is no need to adjust angles of the images during comparison. This further reduces the required time for classification of the coins.

(7) In the angular direction θ in the polar coordinate system, the feature values are calculated from the integrated areas including the divided areas located next to each another in the radial direction. This allows for the recognition of a wider variety of information related to the coin design and further improves the accuracy for classifying coins.

The above embodiment may be modified as described below.

In the above embodiment, the coin type corresponding to the template of which similarity to the feature values calculated from the image of the subject coin is the highest is output as the classification result. Instead, the similarity calculated for each template can be compared with a predetermined threshold value and the coin type corresponding to one or more templates of which the similarities are greater than or equal to the predetermined threshold value may be output as the classification result. With this configuration, the predetermined threshold value is set in a preferred manner so that two or more coin types can be output as the classification result. Accordingly, the coin types are classified more flexibly.

Further, the similarity calculated for each template may be rearranged in order from a larger value so that the coin types corresponding to the template are output in order from those having a higher similarity as the classification result. In this case, all of the candidate coin types may be output as the classification result. Alternatively, only some of the candidate coin types may be output as the classification result. With this configuration, the candidate coin types can be output as a list in order from those having a higher similarity. Thus, the coin types are classified further flexibly.

In the above embodiment, the coin types are classified using all kinds of the autocorrelation functions such as "strength ACF," "strength M-ACF," "gradient ACF," and "gradient M-ACF" as the feature values. Instead, the coin types may be classified using only some kinds of the autocorrelation functions.

In the above embodiment, the feature values are calculated from integrated areas each including divided areas, which are located next to each other in the radial direction, in the angular direction θ of the polar coordinate system when calculating the autocorrelation functions such as "strength M-ACF" and "gradient M-ACF." In the angular direction θ of the polar coordinate system, the integrated areas do not necessarily have to include the divided areas located next to each other in the radial direction. In the angular direction θ of the polar coordinate system, the integrated areas may include the divided areas located discretely in the radial direction.

In the above embodiment, during extraction of the edge gradient components, edge gradient components in different edge gradient directions are extracted. Instead, edge gradient components in a single edge gradient direction may be extracted.

In the above embodiment, an average value of the feature values calculated based on the learning images is used as the template. Instead, a median value of the feature values calculated based on the learning images may be used as the template.

In the above embodiment, the Euclidean distance is used as an example of the synchronization feature that indicates the degree of similarity between the feature values and the templates. In addition, the templates may be compared with information about various components such as the number of peaks of the autocorrelation function curve, interval between the peaks, and the like. Then, the values of comparison results may be converted and added as the synchronization feature.

In the above embodiment, the dispersion degrees of the feature values, which are used for computation of the template of each coin type, are compared. Further, the similarities are calculated giving priority to the feature values with relatively small dispersion degrees, for example, by heavily weighing the feature values with relatively small dispersion degrees. Instead, the similarities may be calculated using all of the feature values in a uniform manner regardless of coin type. With this configuration, even when the image area used for calculation of the feature values is set as a common image for all currency types, the currency types are classified in many aspects using the feature values that have different calculation conditions. This improves the accuracy for classifying currencies.

In the above embodiment, polar coordinate conversion is performed on the edge strength image and the edge gradient images, and the obtained image data is used for calculation of the feature values. Instead of polar coordinate conversion, another coordinate conversion may be employed as long as coin rotation information can be removed, and the image data on a coordinate plane including two coordinate orthogonal axes may be used for calculation of the feature values. Further, the feature values may be calculated using the edge strength image and the edge gradient images as the image data on the xy-coordinate plane in the orthogonal coordinate system without performing any coordinates conversions. Moreover, as long as the information on rotation of the coin is removed, the autocorrelation feature curve does not necessarily have to be calculated as the feature value. For example, histograms of the image data of the edge strength image and the edge gradient images may be generated as the feature values, and the similarities are calculated by comparing the histograms.

In the above embodiment, classification of round coins is described as an example. The present invention may be applied for classification of, for example, coins having other shapes such as polygons and banknotes.

The invention claimed is:

1. A currency classification device that classifies currency types using currency images, the device comprising:
a circuitry that calculates feature values for every currency type that is a candidate for classification from an image area, which is a part of each currency image, the image area being defined by a radial direction from a reference point and an angular direction about the reference point of the currency image, wherein a location of the image area subjected to calculation for the feature value is common in images of every currency type; and a storage that stores the feature values calculated by the circuitry from learning images, which are currency models, as templates for every currency type, wherein the circuitry outputs the currency type corresponding to the template having a highest value of similarity with the feature value calculated by the circuitry from an input image, which is a currency image subject to classification, in the templates stored in the storage as a classification result, the circuitry calculates an autocorrelation function curve that has a coordinate axis extending in the angular direction about the reference point of a currency image as the feature value for each position in the radial direction from the reference point of the currency image, and the similarity is calculated based on synchronization features of the autocorrelation function curve calculated by the circuitry from the input image and the autocorrelation function curve calculated by the circuitry from the learning image for each currency type.

2. The currency classification device according to claim 1, wherein the circuitry outputs the currency type corresponding to the template having a similarity that is greater than or equal to a predetermined threshold value including the currency type corresponding to the template having the highest value of similarity as the classification result.

3. The currency classification device according to claim 1, wherein the circuitry outputs classification results of the currency types corresponding to the templates in order of similarity from higher ones including the currency type corresponding to the template having the highest value of similarity.

4. The currency classification device according to claim 1, wherein the circuitry calculates the feature values based on different calculation conditions, and the similarity is calculated using all of the feature values calculated by the circuitry from the input image that is the currency image subject to classification.

5. The currency classification device according to claim 1, wherein the circuitry calculates the feature values based on different calculation conditions, the template is calculated as an average value or a median value of the feature values calculated from learning images corresponding to the same currency type, and the similarity is calculated by comparing dispersion degrees of the feature values used to calculate the template of each currency type for each of the calculation conditions and giving priority to the feature values calculated based on the calculation conditions having relatively small dispersion degrees.

6. The currency classification device according to claim 1, wherein the circuitry calculates the feature values based on an edge gradient component extracted from a currency image.

7. The currency classification device according to claim 6, wherein the circuitry extracts edge gradient components having different edge directions and calculates the feature values based on ratios of the extracted edge gradient components.

8. The currency classification device according to claim 6, wherein the circuitry calculates the feature values based on an edge strength component extracted from the currency image.

9. The currency classification device according to claim 1, wherein the circuitry adds image data of multiple positions in the radial direction from the reference point of the currency image for each position in the angular direction about the reference point of the currency image and calculates the autocorrelation function curve for each position in the radial direction from the reference point of the currency image based on the image data obtained through the addition.

10. The currency classification device according to claim 1, wherein the circuitry calculates the feature values without changing the location of the image area of a subject currency image.

11. The currency classification device according to claim 1, wherein the image area that is common in images is a single image area.

12. The currency classification device according to claim 1, wherein the image area that is common in images of every currency type is set to a predetermined region in a radial direction of the learning images and the currency image subject to the classification.

13. A method for classifying types of currency using currency images, the method comprising:

calculating feature values for every currency type that is a candidate for classification from an image area, which is a part of each currency image, the image area being defined by a radial direction from a reference point and an angular direction about the reference point of the currency image, wherein a location of the image area subjected to calculation for the feature value is common in images of every currency type;

reading the feature values calculated from learning images, which are currency models, as templates for every currency type;

outputting the currency type corresponding to the template having a highest value of similarity with the feature values calculated from an input image, which is a currency image subject to classification, in the read templates as a classification result; and calculating an autocorrelation function curve that has a coordinate axis extending in the angular direction about the reference point of a currency image as the feature value for each position in the radial direction from the reference point of the currency image, wherein the similarity is calculated based on synchronization features of the autocorrelation function curve from the input image and the autocorrelation function curve from the learning image for each currency type.

* * * * *